United States Patent Office 3,031,915
Patented May 1, 1962

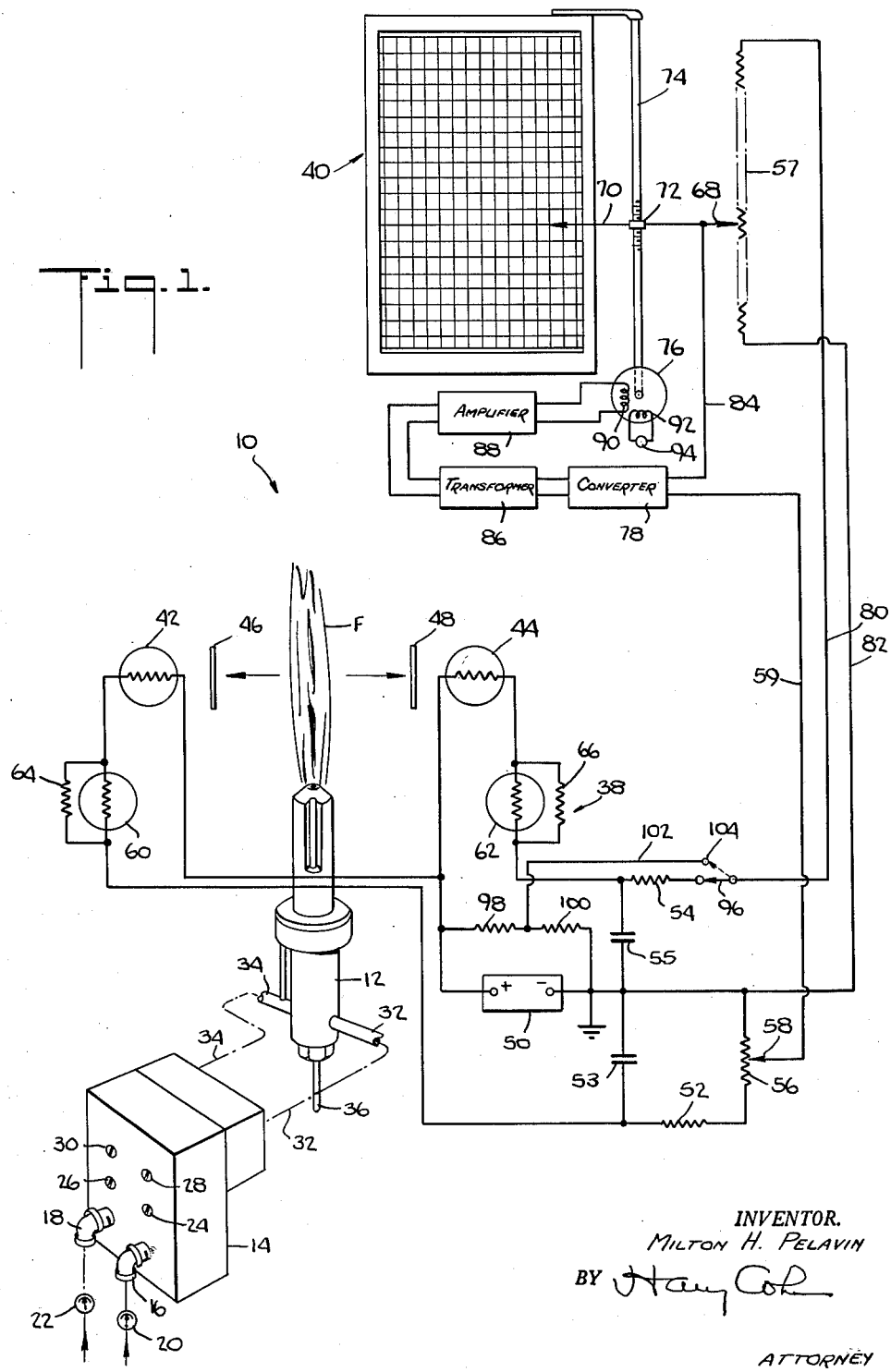

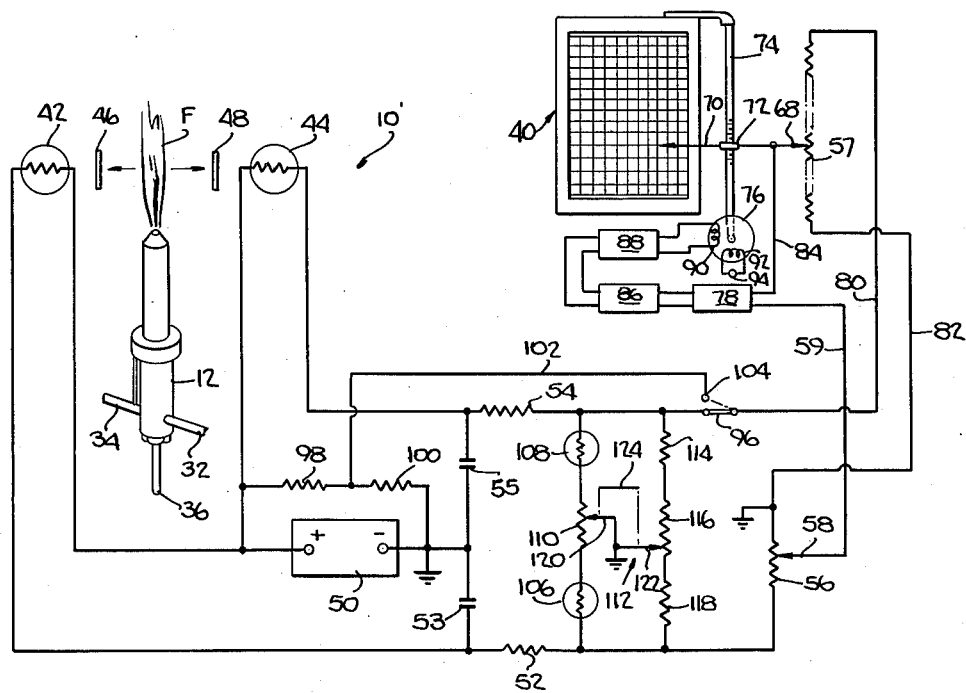
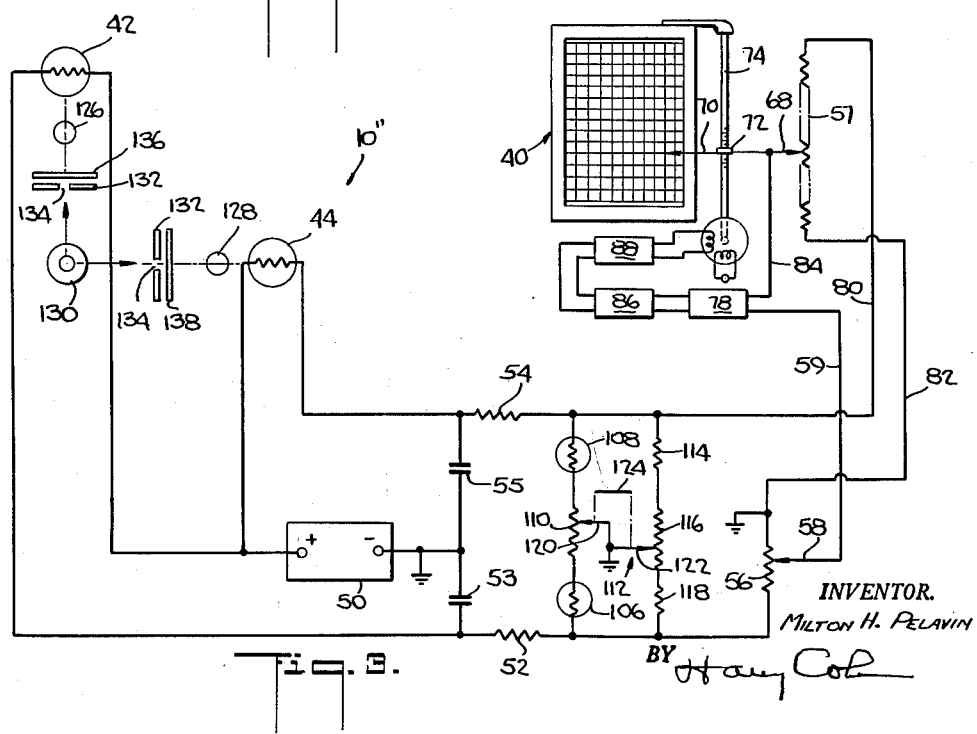

3,031,915
ANALYSIS AND RECORDING APPARATUS AND TEMPERATURE COMPENSATING MEANS THEREFOR
Milton H. Pelavin, Greenburgh, N.Y., assignor to Technicon Instruments Corporation, Chauncey, N.Y., a corporation of New York
Filed Dec. 21, 1960, Ser. No. 77,352
22 Claims. (Cl. 88—14)

This invention relates to analysis and recording apparatus and, more particularly, to the control system of a spectral-flame analysis and recording apparatus for measuring and recording quantitatively the results of the spectral analysis of a substance which is introduced into the flame of the spectral-burner of the apparatus to determine the quantity of an element present in the substance and to the control system of a colorimeter-recorder apparatus which measures and records the light transmittance of a liquid as a measurement of the quantity of a substance therein.

The recording spectral-flame photometer apparatus of this invention may be used for the quantitative analysis of various liquids in respect to one or more substances therein, for example, the analysis of blood serum for sodium or potassium or for both of these substances. In such analysis, lithium chloride or other suitable substance is added to the sample blood serum to provide the sample with an internal standard or reference. When the sample containing the lithium chloride is introduced into the flame of the burner, a quantitative determination of the sodium, for example, is obtained by operating the apparatus "double-ended" whereby spectral light corresponding to the spectral line of the sodium is transmitted to a photosensitive device or light detector to provide a current which is proportional to the amount of said spectral light and spectral light corresponding to the spectral line of the lithium is transmitted to another photosensitive device to provide another current which is proportional to the amount of said spectral light corresponding to the lithium spectral line. A recorder, operable under the control of a null-type balance current ratio system, records the ratio of the currents as a measure of the quantity of the sodium present in the blood serum.

I have discovered the surprising fact that "noise" of the recorder is considerably reduced and in many cases eliminated by adjusting the apparatus prior to "double-ended" analysis operation by operating the apparatus "single-ended" and simultaneously establishing the maximum response of the recorder by adjusting the quantity of the fuel gas or combustion supporting gas, or both, which is supplied to the burner for forming the flame while the sample containing the internal standard is introduced into the flame. More particularly, in accordance with this primary object of the invention, either the photosensitive device responsive to the spectral light of the element under analysis or the photosensitive device responsive to the spectral light of the internal standard is bypassed and concomitantly non-photosensitive electrical means is substituted to provide another current for controlling the operation of the recorder with the apparatus being operated "single-ended," thereby eliminating the effect of the internal standard or the element, each on the other, as the case may be. During this "single-ended" operation of the apparatus, the maximum response of the recorder, according to the quantity of the element or the internal standard present in the sample, is established by adjusting the valves which control the quantity of the fuel gas or combustion supporting gas, or both, supplied to the burner. When the correct flow of the gases to the burner has been established to provide the maximum response of the recorder, the apparatus is then operated "double-ended" for analyzing the sample with the same pre-established valve settings and the "noise" of the recorder is considerably reduced or eliminated, thereby ensuring more accurate analysis results.

Another object of the invention is to provide analysis and recording apparatus wherein the recorder is operable under the control of photosensitive devices in an electric circuit with provision in said electric circuit for neutralizing the effect of temperature variations on said photosensitive devices in a manner whereby the sensitivity of the apparatus remains constant throughout its operating temperature range.

A further object is to provide a spectral-flame analysis and recording apparatus wherein the recorder is operable under the control of photoconductive cells with provision for neutralizing the effect of temperature changes on the resistance of the cells without impairing the sensitivity of the apparatus.

Another object is to provide a colorimeter-recorder apparatus wherein the recorder is operable under the control of photoconductive cells with provision for neutralizing the effect of temperature changes on the resistance of the cells without impairing the sensitivity of the apparatus.

The above and other objects, features and advantages of the invention will be fully understood from the following description considered with reference to the accompanying illustrative drawing.

In the drawings:

FIG. 1 is a combined circuit diagram and diagrammatic view of a spectral-flame analysis and recording photometer apparatus illustrating the method and apparatus of the invention;

FIG. 2 is a view similar to FIG 1 illustrating another and preferred embodiment of the invention; and FIG. 3 is a combined circuit diagram and diagrammatic view of a colorimeter-recorder apparatus in accordance with the invention.

Referring now to the drawings in detail and first with respect to FIG. 1, the recording spectral-flame photometer apparatus 10 comprises a spectral-burner 12 and a valve block 14 which includes provision for mixing a fuel gas, for example propane or cyanogen, and a combustion supporting gas, for example oxygen, to form a combustible gaseous mixture which is transmitted to the burner for forming a main flame and an auxiliary flame which surrounds the main flame. The fuel gas for the flame is supplied to the valve block from a source not shown and enters the valve block through the fitting 16. The combustion supporting gas for the flame is supplied to the valve block from a source not shown and enters the valve block through fitting 18. Pressure regulators 20 and 22 are provided in the flow lines for the fuel gas and the combustion supporting gas, respectively, and control the pressures of said respective gases. Needle valves 24 and 26 control the quantity of the fuel gas and the combustion supporting gas, respectively, which are transmitted as a mixture to the burner for forming the main flame. Similarly, needle valves 28 and 30 control the quantity of the fuel gas and the combustion supporting gas, respectively, which are transmitted as a mixture to the burner for forming the auxiliary flame. The gaseous mixture for the main flame is transmitted to the burner through tube 32 and the gaseous mixture for the auxiliary flame is transmitted to the burner through tube 34. The main flame is indicated at F and the sample which is to be analyzed with respect to an element therein in introduced into the main flame at the upper tip of the burner and is transmitted to said tip through tube 36 which extends upwardly through the burner to the upper tip thereof. A more detailed description of the burner and the valve block is unnecessary for the disclosure of the present invention but if a more detailed description is desired, reference may be had to the application of Jack Isreeli, Serial No. 61,222, filed October 7, 1960, which is owned by the assignee of the present application.

Spectral light corresponding to the spectral lines of the elements in the sample are transmitted to a null-type balance current ratio system 38 which controls the operation of a recorder 40 for indicating the quantity of the element present in the sample undergoing spectral analysis. As indicated previously, lithium chloride or some other suitable substance is introduced into the sample to provide an internal reference or standard. Spectral light corresponding to the spectral line of the element with respect to which the sample is being analyzed is transmitted to the photosensitive device or detector 42 and spectral light corresponding to the spectral line of the internal standard is transmitted to the companion photosensitive device or detector 44. Filter 46 is provided in the path of light from the flame to photosensitive device 42 and passes light corresponding only to the spectral line of the element being analyzed for and filter 48 is provided between the light from the flame and photosensitive device 44 and passes light corresponding only to the spectral line of the internal standard. The photosensitive devices are preferably cadium sulfide photoconductive cells which are well known. Each of the photosensitive devices is energized by a regulated constant voltage power supply indicated at 50 and the current caused to flow in the circuit of each photosensitive device is proportional to the spectral light received by the respective photosensitive device. In circuit with photosensitive device 42 is a resistance 52 and a capacitance 53 and in circuit with photosensitive device 44 is a resistance 54 and a capacitance 55 which provide RC filters to eliminate undesirable noise-producing currents in the respective photosensitive circuits. More particularly, the RC combination of resistance 54 and capacitance 55 eliminates the high frequency component of the current from reaching slide wire 57 of the recorder 40. Similarly, the RC combination of resistance 52 and capacitance 53 eliminates the high frequency component of the current from reaching load resistance 56. Resistances 52 and 54 are employed in order to reduce the sizes of capacitors 53 and 55, respectively, to practical sizes. Load resistance 56 is provided with an adjustable tap 58.

Provision is made for neutralizing the change in resistance of photosensitive devices 42 and 44 due to variations in ambient temperature. More particularly, the resistance of the photosensitive devices decreases with increases in the light to which the devices are exposed but the resistance increases with increase in temperature. The ambient temperature effect on the resistance of said photosensitive device is neutralized by the provision of the thermistors 60 and 62 in series with the devices 42 and 44, respectively, in temperature equalizing relation therewith. The thermistors 60 and 62 are provided, if necessary, with trimming resistances 64 and 66 in shunt with said thermistors, respectively, to match or reduce the differences in temperature-resistance characteristics of the thermistor and its corresponding photosensitive device.

The recorder 40 is of the well known self-balancing slide wire type, the slide wire potentiometer being indicated at 57 as previously mentioned, the movable tap at 68 and the recorder stylus which is moved in unison with said tap is indicated at 70. Tap 68 and stylus 70 are connected to the nut 72 which is moved longitudinally of threaded rotary rod 74 which is driven by the two-phase motor 76. It will be understood that nut 72 is held against rotation and rod 74 is held against longitudinal movement so that when it is rotated by motor 76 the nut 72 is moved longitudinally for the balancing operation of tap 68 and the concomitant movement of stylus 70, the movement of stylus 70 providing a recording on the chart of the recorder.

As is well known to those skilled in the art, the response of photosensitive device 42 to the spectral light varies the current flow through the device and provides a current flow through resistor 56 which produces a voltage drop across said resistor and a portion of said voltage is applied by tap 58 and lead 59 to a converter 78. Similarly, the response of photosensitive device 44 to the spectral light varies the current flow through the device and provides a current flow through the resistance 54 and the slide wire 57 which is connected to the reference side of circuit 38 by leads 80 and 82. Tap 68 of the slide wire potentiometer is connected to converter 78 by lead 84, so that the voltage difference between tap 58 and tap 68 is applied to the converter. The converter changes the D.C. voltage into an A.C. voltage and the A.C. voltage output of the converter is applied to the transformer 86, amplified by the amplifier 88, and applied to the winding 90 of the two-phase motor 76. The other winding 92 of the two-phase motor is energized by an A.C. source indicated at 94. The motor 76 operates in response to the voltage difference between taps 58 and 68 to drive tap 68 of the potentiometer to balance the system at which point there is no voltage applied to converter 78. The movement of the stylus 70 during the balancing operation makes a record on the chart of the recorder which is the ratio of the current responses of the photosensitive devices and is a measure of the quantity of the element present in the substance being analyzed.

In order to operate the recording apparatus "single-ended" to obtain the proper valve settings of valves 24 and 26 for the proper flow of gases for the main flame to obtain maximum response of the recorder and consequently minimum "noise," as herein shown the internal reference side of the electrical system 38 is bypassed so that photosensitive device 44 is no longer in the circuit. More particularly, a switch 96 is provided which is operable to disconnect photosensitive device 44 from the circuit and concomitantly connect resistors 98 and 100 across voltage supply 50. The resistances are selected so that their ohmic values provide a voltage distribution across slide wire 57 which is the same as the voltage distribution across said slide wire when the apparatus is operating "double-ended." The resistances are connected to the slide wire 57 by lead 102 and the contact 104 of the switch 96. In the switched condition of the circuit for "single-ended" operation, the valve 24 or the valve 26, or both, are adjusted to effect the maximum response of the recorder and when the correct positions of the valves have been determined during said "single-ended" operation, switch 96 is moved into "double-ended" operating position and the sample is analyzed in comparison with the internal standard, the previously determined positions of the valves 24 and 26 ensuring minimum interference with the recording due to "noise."

Each thermistor-trimming resistance combination 60, 64 and 62, 66 may be provided with a resistor in series with the combination to obviate any change in the resistance of the corresponding photosensitive circuit due to the addition of the trimming resistance. In this manner, the combination of the thermistor, the trimming resistance and the series resistor provides an equivalent resistance in series with the corresponding photosensitive device and the resistance of the respective photosensitive circuit remains the same at the particular reference temperature of the photosensitive device at which the trimming resistance and series resistor are selected, it being understood that different trimming resistances and corresponding series resistors are required to different reference temperatures for optimum matching of the thermistor with the corresponding photosensitive device. Adjustment of tap 58 will effect resistance changes to balance the resistance of each photosensitive circuit as the thermistor in each circuit is trimmed, but the movement of tap 58 and the corresponding changes in resistance are limited and may not be enough to compensate for resistance changes due to the provision of the trimming resistances.

It will be apparent that the equivalent series resistance of the thermistor-trimming resistance combination and series resistor in each photosensitive circuit are necessarily high because the resistance of the photoconductive cell in each circuit is high requiring a high resistance thermistor in series therewith. As the temperatures of the photoconductive cell varies from the reference temperature at which the thermistor was trimmed, the series equivalent resistance changes to compensate for the changes in the resistance of the photoconductive cell. In this manner, the relative values of the resistance of the equivalent resistance and the photoconductive cell vary causing the sensitivity of the circuit to vary because the current flow through the circuit is effected considerably by the high equivalent series resistance. In other words, the current flow in the circuit due to changes in the resistance of the photoconductive cell effected by the light being measured is considerably reduced due to the high equivalent series resistance and since this resistance varies with temperature changes its effect on the current flow in the circuit in comparison to the effect of the photoconductive cell on the current flow varies, whereby the sensitivity of the circuit varies with temperature changes. As will be fully explained hereinafter with respect to FIGS. 2 and 3, the temperature compensating means shown in FIG. 1 has been modified to provide such means for each photosensitive cell in the manner which does not change the sensitivity of the corresponding photosensitive circuit throughout the operating temperature range of the apparatus.

Referring now to FIG. 2, there is shown a spectral-flame analysis and recording apparatus 10' similar to the apparatus shown in FIG. 1 but modified to provide temperature compensating means 106 and 108 in shunt relation with photoconductive cells 42 and 44, respectively. Each temperature compensating means is a low resistance device, preferably one sold under the trademark "Sensistor," whose resistance increases with increases in temperature which is also true of the resistance-temperature characteristic of the photoconductive cells. Device 106 is connected in shunt with load resistance 56 and series with one end of slide wire 110 of a dual potentiometer 112 and device 108 is connected in shunt with slide wire 57 and in series with the other end of slide wire 110. A resistance 114 is connected in parallel with device 108 and the resistance is connected in series with one end of slide wire 116 of potentiometer 112. A resistance 118 is connected in parallel with device 106 and in series with the other end of slide wire 116. Slide wires 110 and 116 are provided with the movable taps 120 and 122, respectively, which are operatively connected together, as indicated by broken line 124, in a manner so that movement of one tap results in the movement of the other tap in the opposite direction. The taps are connected to ground and wire 82 which connects load resistance 56 to slide wire 57 is also connected to ground. The portion of slide wire 110 between tap 120 and device 108 provides a trimming device in series with the sensitor and similarly the portion of slide wire 110 between device 106 and tap 120 provides a trimming resistor in series with device 106. As tap 120 is moved to increase or decrease the trimming resistance of device 108, for example, tap 122 moves in an opposite direction to decrease or increase the resistance, as the case may be, in series with resistor 114 whereby the equivalent resistance provided by device 108, the portion of slide wire 110 in series therewith, resistance 114 and the portion of slide wire 116 in series therewith, remains the same during trimming of device 108. It will be observed that trimming of the devices 106 and 108 may cause a slight unbalance of the ratio circuit. In such case, tap 58 of load resistance 56 can be adjusted during standardization of the apparatus to balance the reference and samples sides of the circuit.

It will be observed that device 106, the portion of slide wire 110 in series therewith, resistance 118 and the portion of slide wire 116 in series therewith also provide an equivalent resistance which does not change in value during trimming of device 106. However, the equivalent resistances for the sample side of the circuit and the reference side of the circuit do change in value as the temperature varies since the resistance of the device changes with temperature. The equivalent resistances are selected so that their resistance-temperature characteristic is such that the product of the varying resistance of the equivalent resistance and the varying current flow therethrough because of the changes of resistances of the photoconductive cells due to variations in ambient temperature provides a constant voltage across slide wire 57 and load resistance 56. In this manner, the effect of varying ambient temperatures on the resistance of the photoconductive cells has been compensated for or neutralized. Because the equivalent resistances are low which is due to the provision of low resistance devices 106 and 108 in shunt with the photoconductive cells, slide wire 57 and load resistance 56, they have little influence on the current flow through the respective photosensitive circuits and the current flow through said circuits is effected largely by the high resistance photoconductive cells. Accordingly, even though the equivalent resistances change as the temperature changes, the sensitivity of the circuit remains the same throughout the operating temperature range of the apparatus.

In FIG. 3 there is shown a circuit similar to the one shown in FIG. 2 but in a colorimeter-recorder apparatus 10'' wherein devices 106 and 108 are provided for photoconductive cells 42 and 44, respectively, as described above so that variations in the resistance of the photoconductive cells due to changes in ambient temperature are compensated for in a manner which does not effect the sensitivity of the apparatus for measuring and recording the light transmitted by the sample in the flow cell 126 and transmitted by the reference cell or standard 128 from the light source 130 to the cells 42 and 44, respectively. Light shields are shown at 132 having apertures 134 for the passage of the light beams and light filters 136 and 138 are provided for the cells 42 and 44, respectively. The by-pass switch 96 and resistors 98 and 100 have been eliminated since they are only useful with a spectral-flame photometer apparatus. In all other respects the apparatus of FIG. 3 is the same as the apparatus of FIG. 2 and it will be understood that the current balance ratio system and temperature compensating means operate in the same manner.

Certain parts of the apparatus shown herein are also shown and described in my copending U.S. application, Serial No. 853,076 filed November 16, 1959 and assigned to the assignee of the present application. A null-type balance current ratio system similar to system 38 disclosed herein is also disclosed in my copending U.S. application Serial No. 747,674 filed July 10, 1958 which is also assigned to the assignee of the present application.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of adjusting a spectral-flame analyzer for the spectral-flame analysis of a liquid containing a substance and an internal standard as constituents thereof, wherein a recording spectral-flame photometer apparatus is provided comprising a spectral-flame burner, means for supplying a mixture of fuel gas and a combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; said method comprising bypassing one of said photosensitive devices and substituting in lieu thereof means operable independently of the light from said burner to provide a current in lieu of the current corresponding to the spectral light from one of said constituents, adjusting the quantity of at least one of the gases of said mixture supplied to said burner and simultaneously operating said recorder in response to the ratio of said last mentioned current and one of said first and second currents to obtain the maximum response of said recorder, and thereafter bypassing said light independent operable means and substituting in lieu thereof said previously bypassed photosensitive device and operating said recorder in response to the ratio of said first and second currents at the predetermined adjusted quantity of said gases supplied to said burner for the spectral-flame analysis of said substance.

2. A method of adjusting a spectral-flame analyzer for the spectral-flame analysis of a liquid contaiining a substance and an internal standard as constituents thereof, wherein a recording spectral-flame photometer apparatus is provided comprising a spectral-flame burner, means for supplying a mixture of fuel gas and a combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; said method comprising bypassing one of said photosensitive devices and substituting in lieu thereof resistance means operable to provide a current in lieu of the current corresponding to the spectral light from one of said constituents, adjusting the quantity of at least one of the gases of said mixture supplied to said burner and simultaneously operating said recorder in response to the ratio of said last mentioned current and one of said first and second currents to obtain the maximum response of said recorder, and thereafter bypassing said resistance means and substituting in lieu thereof said previously bypassed photosensitive device and operating said recorder in response to the ratio of said first and second currents at the predetermined adjusted quantity of said gases supplied to said burner for the spectral-flame analysis of said substance.

3. In recording spectral-flame photometer apparatus for the spectral-flame analysis of a liquid containing a substance and an internal standard as constituents thereof, said apparatus comprising a spectral-flame burner, means for supplying a mixture of fuel gas and combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; means for bypassing one of said photosensitive devices and substituting in lieu thereof means operable independently of the light from said burner to provide a current in lieu of the current corresponding to the spectral light from one of said constituents, means for adjusting the quantity of at least one of the gases of said mixture supplied to said burner during the operation of said recorder in response to the ratio of said last mentioned current and one of said first and second currents to obtain the maximum response of said recorder, said bypassing means being operable to bypass said light independent operable means to substitute in lieu thereof said previously bypassed photosensitive device for operating said recorder in response to the ratio of said first and second currents at the predetermined adjusted quantity of said gases supplied to said burner for the spectral-flame analysis of said substance.

4. In recording spectral-flame photometer apparatus for the spectral-flame analysis of a liquid containing a substance and an internal standard as constituents thereof, said apparatus comprising a spectral-flame burner, means for supplying a mixture of fuel gas and combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; means for bypassing one of said photosensitive devices and substituting in lieu thereof resistance means operable to provide a current in lieu of the current corresponding to the spectral light from one of said constituents, means for adjusting the quantity of at least one of the gases of said mixture supplied to said burner during the operation of said recorder in response to the ratio of said last mentioned current and one of said first and second currents to obtain the maximum response of said recorder, said bypassing means being operable to bypass said resistance means to substitute in lieu thereof said previously bypassed photosensitive device for operating said recorder in response to the ratio of said first and second currents at the predetermined adjusted quantity of said gases supplied to said burner for the spectral-flame analysis of said substance.

5. In recording spectral-flame photometer apparatus for the spectral-flame analysis of a liquid containing a substance and an internal standard as constituents thereof, said apparatus comprising a spectral-flame burner, means for supplying a mixture of fuel gas and combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; means for bypassing one of said photosensitive devices and substituting in lieu thereof means operable independently of the light from said burner to provide a current in lieu of the current corresponding to the spectral light from one of said constituents, means for adjusting the quantity of at least one of the gases of said mixture supplied to said burner during the operation of said recorder in response to the ratio of said last mentioned current and one of said first and second currents to obtain the maximum response of said recorder, said bypassing means being operable to bypass said light independent operable means to substitute in lieu thereof said previously by-passed photosensitive device for operating said recorder in response to the ratio of said first and second currents at the predetermined adjusted quantity of said gases supplied to said burner for the spectral-flame analysis of said substance, and means for each of said photosensitive devices for neutralizing the effect of ambient temperature variations on said devices.

6. In recording spectral-flame photometer apparatus for the spectral-flame analysis of a liquid containing a substance and an internal standard as constituents thereof, said apparatus comprising a spectral-flame burner, means for supplying a mixture of fuel gas and combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; means for bypassing one of said photosensitive devices and substituting in lieu thereof resistance means operable to provide a current in lieu of the current corresponding to the spectral light from one of said constituents, means for adjusting the quantity of at least one of the gases of said mixture supplied to said burner during the operation of said recorder in response to the ratio of said last mentioned current and one of said first and second currents to obtain the maximum response of said recorder, said bypassing means being operable to bypass said resistance means to substitute in lieu thereof said previously bypassed photosensitive device for operating said recorder in response to the ratio of said first and second currents at the predetermined adjusted quantity of said gases supplied to said burner for the spectral-flame analysis of said substance, and means for each of said photosensitive devices for neutralizing the effect of ambient temperature variations on said devices.

7. In recording spectral-flame photometer apparatus for the spectral-flame analysis of a liquid containing a substance and an internal standard as constituents thereof, said apparatus comprising a spectral-flame burner, means for supplying a mixture of fuel gas and combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; resistance means adapted to be connected in the circuit of said current ratio system and operable to provide a current independent of the light from said flame, switch means for bypassing one of said photosensitive devices and substituting in lieu thereof said resistance means and thereby providing said last mentioned current in lieu of the current corresponding to the spectral light from one of said constituents, said gas mixture supplying means including means for adjusting the quantity of at least one of the gases of said mixture supplied to said burner during the operation of said recorder in response to the ratio of said last mentioned current and one of said first and second currents to obtain the maximum response of said recorder, said switch means being operable to bypass said resistance means and to substitute in lieu thereof said previously bypassed photosensitive device for operating said recorder in response to the ratio of said first and second currents at the predetermined adjusted quantity of said gases supplied to said burner for the spectral-flame analysis of said substance.

8. In recording spectral-flame photometer apparatus for the spectral-flame analysis of a liquid containing a substance and an internal standard as constituents thereof, said apparatus comprising a spectral-flame burner, means for supplying a mixture of fuel gas and combustion supporting gas to said burner for forming the flame thereof, a recorder, and a null-type balance current ratio system including a photosensitive device for receiving the spectral light corresponding to said substance to provide a first current and another photosensitive device for receiving the spectral light corresponding to said internal standard to provide a second current, said recorder being operable by said current ratio system in response to the ratio of said first and second currents; resistance means adapted to be connected in the circuit of said current ratio system and operable to provide a current independent of the light from said flame, switch means for bypassing one of said photosensitive devices and substituting in lieu thereof said resistance means and thereby providing said last mentioned current in lieu of the current corresponding to the spectral light from one of said constituents, said gas mixture supplying means including means for adjusting the quantity of at least one of the gases of said mixture supplied to said burner during the operation of said recorder in response to the ratio of said last mentioned current and one of said first and second currents to obtain the maximum response of said recorder, said switch means being operable to bypass said resistance means and to substitute in lieu thereof said previously bypassed photosensitive device for operating said recorder in response to the ratio of said first and second currents at the predetermined adjusted quantity of said gases supplied to said burner for the spectral-flame analysis of said substance, and means for each of said photosensitive devices for neutralizing the effect of ambient temperature variations on said devices.

9. In apparatus wherein the concentration of a substance in a liquid is recordded by comparing the light transmitted due to said substance and the light transmitted due to a reference standard; a photosensitive device responsive to the light transmitted due to said substance, another photosensitive device responsive to the light transmitted due to said reference standard, an electric system including said photosensitive devices in a null-type balance current ratio circuit, a recorder operable under the control of said electric system for recording the current ratio of said photosensitive devices as a measure of the concentration of said substance in the liquid, and temperature responsive means for each of said photosensitive devices in shunt relation with the companion photosensitive device to neutralize the changes occurring in the electrical characteristics of said photosensitive devices due to temperature changes.

10. In apparatus wherein the concentration of a substance in a liquid is recorded by comparing the light transmitted due to said substance and the light transmitted due to a reference standard; a photosensitive device responsive to the light transmitted due to said substance, another photosensitive device responsive to the light transmitted due to said reference standard, an electric system including said photosensitive devices in a null-type balance current ratio circuit, a recorder operable under the control of said electric system for recording the current ratio of said photosensitive devices as a measure of the concentration of said substance in the liquid, temperature responsive means for each of said photosensitive devices in shunt relation with the companion photosensitive device to neutralize the changes occurring in the electrical characteristics of said photosensitive devices due to temperature changes, and means for each of said temperature responsive means in circuit with the companion temperature responsive means for trimming said temperature responsive means without changing the current flow through said photosensitive devices.

11. In apparatus wherein the concentration of a substance in a liquid is recorded by comparing the light transmitted due to said substance and the light transmitted due to a reference standard; a photosensitive device responsive to the light transmitted due to said substance, another photosensitive device responsive to the light transmitted due to said reference standard, an electric system including said photosensitive devices in a null-type balance current ratio circuit, a recorder operable under the control of said electric system for recording the current ratio of said photosensitive devices as a measure of the concentration of said substance in the liquid, temperature responsive means for each of said photosensitive devices in shunt relation with the companion photosensitive devices to neutralize the changes occurring in the electrical characteristics of said photosensitive devices due to temperature changes, and means for each of said temperature responsive means in circuit with the companion temperature responsive means for trimming said temperature responsive means without changing the current flow through said photosensitive devices, said last mentioned means comprising a slide wire in series with the companion temperature responsive means and another slide wire in parallel with said companion temperature responsive means, and a tap for each of said slide wires movable concomitantly in opposite directions, whereby the equivalent resistance of said temperature responsive means and the tapped portions of said slide wires remains constant during movements of said taps.

12. In apparatus wherein the concentration of a substance in a liquid is recorded by comparing the light transmitted due to said substance and the light transmitted due to a reference standard; a photoconductive cell responsive to the light transmitted due to said substance, another photoconductive cell responsive to the light transmitted due to said reference standard, an electric system including said photoconductive cells in a null-type balance current ratio circuit, a recorder operable under the control of said electric system for recording the current ratio of said photoconductive cells as a measure of the concentration of said substance in the liquid, and a resistance device for each of said photoconductive cells in shunt relation with the companion photoconductive cell and having a resistance which increases with increases in temperature to neutralize the changes occurring in the resistance-temperature characteristics of said photoconductive cells due to temperature changes.

13. In apparatus wherein the concentration of a substance in a liquid is recorded by comparing the light transmitted due to said substance and the light transmitted due to a reference standard; a photoconductive cell responsive to the light transmitted due to said substance, another photoconductive cell responsive to the light transmitted due to said reference standard, an electric system including said photoconductive cells in a null-type balance current ratio circuit, a recorder operable under the control of said electric system for recording the current ratio of said photoconductive cells as a measure of the concentration of said substance in the liquid, a resistance device for each of said photoconductive cells in shunt relation with the companion photoconductive cell and having a resistance which increases with increases in temperature to neutralize the changes occurring in the resistance-temperature characteristics of said photoconductive cells due to temperature changes, and resistance means for each of said resistance devices in circuit with the companion device for trimming said devices without changing the current flow through said photoconductive cells.

14. In apparatus wherein the concentration of a substance in a liquid is recorded by comparing the light transmitted due to said substance and the light transmitted due to a reference standard; a photoconductive cell responsive to the light transmitted due to said substance, another photoconductive cell responsive to the light transmitted due to said reference standard, an electric system including said photoconductive cells in a null-type balance current ratio circuit, a recorder operable under the control of said electric system for recording the current ratio of said photoconductive cells as a measure of the concentration of said substance in the liquid, a resistance device for each of said photoconductive cells in shunt relation with the companion photoconductive cell and having a resistance which increases with increases in temperature to neutralize the changes occurring in the resistance-temperature characteristics of said photoconductive cells due to temperature changes, and resistance means for each of said resistance devices in circuit with the companion device for trimming said devices without changing the current flow through said photoconductive cells, said resistance means comprising a slide wire in series with the companion device and another slide wire in parallel with said companion device, and a tap for each one of said slide wires movable concomitantly in opposite directions, whereby the equivalent resistance of said devices and the tapped portions of said slide wires remains constant during movements of said taps.

15. In apparatus wherein the concentration of a substance in a liquid is recorded by comparing the light transmitted due to said substance and the light transmitted due to a reference standard; a photosensitive device responsive to the light transmitted due to said substance, another photosensitive device responsive to the light transmitted due to said reference standard, an electric system including said photosensitive devices in a null-type balance current ratio circuit, a slide wire potentiometer having a tap operable under the control of said electric system for movement in accordance with the current ratio of said photosensitive devices as a measure of the concentration of said substance in the liquid, said slide wire being connected in the circuit of said photosensitive device for said reference standard, and a load resistance connected in the circuit of said photosensitive device for said substance, and temperature responsive means for each of said photosensitive devices, one of said temperature responsive means being in shunt with said slide wire and the other of said temperature responsive means being in shunt with said load resistance to neutralize the changes occurring in the electrical characteristics of the companion photosensitive device due to temperature changes.

16. In apparatus wherein the concentration of a substance in a liquid is recorded by comparing the light transmitted due to said substance and the light transmitted due to a reference standard; a photosensitive device responsive to the light transmitted due to said substance, another photosensitive device responsive to the light transmitted due to said reference standard, an electric system including said photosensitive devices in a null-type balance current ratio circuit, a slide wire potentiometer having a tap operable under the control of said electric system for movement in accordance with the current ratio of said photosensitive devices as a measure of the concentration of said substance in the liquid, said slide wire being connected in the circuit of said photosensitive device for said reference standard, and a load resistance connected in the circuit of said photosensitive device for said substance, temperature responsive means for each of said photosensitive devices, one of said temperature responsive means being in shunt with said slide wire and the other of said temperature responsive means being in shunt with said load resistance to neutralize the changes occurring in the electrical characteristics of the companion photosensitive devices due to temperature changes, and means for each of said temperature responsive means in circuit with the companion temperature responsive means for trimming said temperature responsive means without changing the current flow through said photosensitive devices.

17. In apparatus wherein the concentration of a substance in a liquid is recorded by comparing the light transmitted due to said substance and the light transmitted due to a reference standard; a photosensitive device responsive to the light transmitted due to said substance, another photosensitive device responsive to the light transmitted due to said reference standard, an electric system including said photosensitive devices in a null-type balance current ratio circuit, a slide wire potentiometer having a tap operable under the control of said electric system for movement in accordance with the current ratio of said photosensitive devices as a measure of the concentration of said substance in the liquid, said slide wire being connected in the circuit of said photosensitive device for said reference standard, and a load resistance connected in the circuit of said photosensitive device for said substance, temperature responsive means for each of said photosensitive devices, one of said temperature responsive means being in shunt with said slide wire and the companion photosensitive device and the other of said temperature responsive means being in shunt with said load resistance and the other photosensitive device to neutralize the changes occurring in the electrical characteristics of the companion photosensitive devices due to temperature changes, and means for each of said temperature responsive means in circuit with the companion temperature responsive means for trimming said temperature responsive means without changing the current flow through said photosensitive devices, said last mentioned means comprising a slide wire in series with said companion temperature responsive means and another slide wire in parallel with said companion temperature responsive means, and a tap for each of said slide wires movable concomitantly in opposite directions, whereby the equivalent resistance of said temperature responsive means and the tapped portions of said slide wires remains constant during movements of said taps.

18. In apparatus wherein the concentration of a substance in a liquid is recorded by comparing the light transmitted due to said substance and the light transmitted due to a reference standard; a photoconductive cell responsive to the light transmitted due to said substance, another photoconductive cell responsive to the light transmitted due to said reference standard, an electric system including said photoconductive cells in a null-type balance current ratio circuit, a slide wire potentiometer having a tap operable under the control of said electric system for movement in accordance with the current ratio of said photoconductive cells as a measure of the concentration of said substance in the liquid, said slide wire being connected in the circuit of said photoconductive cell for said reference standard, and a load resistance connected in the circuit of said photoconductive cell for said substance, and a resistance device for each of said photoconductive cells, each of said devices having a resistance which increases with increases in temperature, one of said devices being in shunt with said slide wire and the companion photoconductive cell and the other of said devices being in shunt with said load resistance and the other photoconductive cell to neutralize the changes occurring in the resistance-temperature characteristics of the companion photoconductive cells due to temperature changes.

19. In apparatus wherein the concentration of a substance in a liquid is recorded by comparing the light transmitted due to said substance and the light transmitted due to a reference standard; a photoconductive cell responsive to the light transmitted due to said substance, another photoconductive cell responsive to the light transmitted due to said reference standard, an electric system including said photoconductive cells in a null-type balance current ratio circuit, a slide wire potentiometer having a tap operable under the control of said electric system for movement in accordance with the current ratio of said photoconductive cells as a measure of the concentration of said substance in the liquid, said slide wire being connected in the circuit of said photoconductive cell for said reference standard, and a load resistance connected in the circuit of said photoconductive cell for said substance, a resistance device for each of said photoconductive cells, each of said devices having a resistance which increases with increases in temperature, one of said devices being in shunt with said slide wire and the companion photoconductive cell and the other of said devices being in shunt with said load resistance and the other photoconductive cell to neutralize the changes occurring in the resistance-temperature characteristics of the companion photoconductive cells due to temperature changes, and resistance means in circuit with each one of said devices for trimming said devices without changing the current flow through said photoconductive cells.

20. In apparatus wherein the concentration of a substance in a liquid is recorded by comparing the light transmitted due to said substance and the light transmitted due to a reference standard; a photoconductive cell responsive to the light transmitted due to said substance, another photoconductive cell responsive to the light transmitted due to said reference standard, an electric system including said photoconductive cells in a null-type balance current ratio circuit, a slide wire potentiometer having a tap operable under the control of said electric system for movement in accordance with the current ratio of said photoconductive cells as a measure of the concentration of said substance in the liquid, said slide wire being connected in the circuit of said photoconductive cell for said reference standard, and a load resistance connected in the circuit of said photoconductive cell for said substance, a resistance device for each of said photoconductive cells, each of said devices having a resistance which increases with increases in temperature, one of said devices being in shunt with said slide wire and the companion photoconductive cell and the other of said devices being in shunt with said load resistance and the other photoconductive cell to neutralize the changes occurring in the resistance-temperature characteristics of the companion photoconductive cells due to temperature changes, and resistance means for each of said devices in circuit with the companion device for trimming the latter without changing the current flow through the companion photoconductive cells, said resistance means comprising a slide wire in series with the companion device and another slide wire in parallel with said companion device, and a tap for each one of said slide wires movable concomitantly in opposite directions, whereby the equivalent resistance of said devices and the tapped portions of said slide wires remains constant during movements of said taps.

21. In recording spectral-flame photometer apparatus for the spectral-flame analysis of a liquid containing a substance and an internal reference standard as constituents thereof; a photoconductive cell responsive to the spectral light corresponding to said substance and another photoconductive cell responsive to the spectral light corresponding to said reference standard, an electric system including said photoconductive cells in a null-type balance current ratio circuit, a slide wire potentiometer having a tap operable under the control of said electric system for movement in accordance with the current ratio of said photoconductive cells as a measure of the concentration of said substance in the liquid, said slide wire being connected in the circuit of said photoconductive cell for said reference standard, and a load resistance connected in the circuit of said photoconductive cell for said substance, a resistance device for each of said photoconductive cells, each of said devices having a resistance which increases with increases in temperature, one of said devices being in shunt with said slide wire and the companion photoconductive cell and the other of said devices being in shunt with said load resistance and the other photoconductive cell to neutralize the changes occurring in the resistance-temperature characteristics of the companion photoconductive cells due to temperature changes, and resistance means for each of said devices in circuit with the companion device for trimming the latter without changing the current flow through the companion photoconductive cells, said resistance means comprising a slide wire in series with the companion device and another slide wire in parallel with said companion device, and a tap for each one of said slide wires movable concomitantly in opposite directions, whereby the equivalent resistance of said devices and the tapped portions of said slide wires remains constant during movements of said taps.

22. In colorimeter-recording apparatus for the colorimetric analysis of a liquid with respect to a substance contained therein by comparing the light transmission of a reference standard with the light transmission of the substance; a photoconductive cell responsive to the light transmission of said substance, another photoconductive cell responsive to the light transmission of said reference standard, an electric system including said photoconductive cells in a null-type balance current ratio circuit, a slide wire potentiometer having a tap operable under the control of said electric system for movement in accordance with the current ratio of said photoconductive cells as a measure of the concentration of said substance in the liquid, said slide wire being connected in the circuit of said photoconductive cell for said reference standard, and a load resistance connected in the circuit of said photoconductive cell for said substance, a resistance device for each of said photoconductive cells, each of said devices having a resistance which increases with increases in temperature, one of said devices being in shunt with said slide wire and the companion photoconductive cell and the other of said devices being in shunt with said load resistance and the other photoconductive cell to neutralize the changes occurring in the resistance-temperature characteristics of the companion photoconductive cells due to temperature changes, and resistance means for each of said devices in circuit with the companion device for trimming the latter without changing the current flow through the companion photoconductive cells, said resistance means comprising a slide wire in series with the companion device and another slide wire in parallel with said companion device, and a tap for each one of said slide wires movable concomitantly in opposite directions, whereby the equivalent resistance of said devices and the tapped portions of said slide wires remains constant during movements of said taps.

References Cited in the file of this patent

UNITED STATES PATENTS 2,843,007    Galey et al. _____ July 15, 1958